US008390939B2

(12) United States Patent
Henriksen et al.

(10) Patent No.: US 8,390,939 B2
(45) Date of Patent: Mar. 5, 2013

(54) FLEXIBLE LENS ASSEMBLY WITH VARIABLE FOCAL LENGTH

(75) Inventors: Lars Henriksen, Tonsberg (NO); Morten Eliassen, Sandefjord (NO); Vladimir Kartashov, Horten (NO); Jon Herman Ulvensoen, Asgardstrand (NO); Ib-Rune Johansen, Oslo (NO); Karl Henrik Haugholt, Oslo (NO); Dag Torstein Wang, Oslo (NO); Frode Tyholdt, Oslo (NO); Wilfred Booij, Nordby (NO)

(73) Assignee: poLight AS, Horten (NO)

( * ) Notice: Subject to any disclaimer, the term of this patent is extended or adjusted under 35 U.S.C. 154(b) by 217 days.

(21) Appl. No.: 12/526,763

(22) PCT Filed: Feb. 12, 2008

(86) PCT No.: PCT/NO2008/000056
§ 371 (c)(1),
(2), (4) Date: Dec. 10, 2010

(87) PCT Pub. No.: WO2008/100154
PCT Pub. Date: Aug. 21, 2008

(65) Prior Publication Data
US 2011/0096411 A1 Apr. 28, 2011

(30) Foreign Application Priority Data
Feb. 12, 2007 (NO) .................................. 20070803

(51) Int. Cl.
*G02B 15/14* (2006.01)
*G02B 7/02* (2006.01)

(52) U.S. Cl. .................... 359/694; 359/811; 359/824
(58) Field of Classification Search .......... 359/694–700, 359/811–824, 642
See application file for complete search history.

(56) References Cited

U.S. PATENT DOCUMENTS

| 5,886,332 | A | 3/1999 | Plesko |
| 6,188,526 | B1 | 2/2001 | Sasaya et al. |
| 7,697,214 | B2 * | 4/2010 | Batchko et al. ............... 359/665 |
| 2002/0048096 | A1 | 4/2002 | Melzer et al. ................ 359/846 |
| 2002/0149864 | A1 | 10/2002 | Kaneko |
| 2004/0008419 | A1 | 1/2004 | Schachar |

(Continued)

FOREIGN PATENT DOCUMENTS

| CN | 2706779 | 6/2005 |
| DE | 3644225 | 7/1987 |

(Continued)

OTHER PUBLICATIONS

Extended European Search Report dated Aug. 9, 2010 in European Patent Application No. EP 0 871 2671, filed Feb. 12, 2008.

(Continued)

*Primary Examiner* — Mohammed Hasan
(74) *Attorney, Agent, or Firm* — Knobbe Martens Olson & Bear, LLP (57) ABSTRACT

The present invention is related to a lens assembly comprising a flexible lens body (10) inside a cavity bounded by a sidewall (11) and a first transparent cover (13), and a second transparent cover (14), wherein both covers (13,14) are in contact with respective surfaces of the lens body (10). Piezo electric elements (12) shapes the lens body (10) when activated, thereby adjusting the focal length of the lens assembly.

14 Claims, 5 Drawing Sheets

U.S. PATENT DOCUMENTS

| | | | |
|---|---|---|---|
| 2005/0036195 A1 | 2/2005 | Nishioka | 359/291 |
| 2005/0133789 A1 | 6/2005 | Oh et al. | |
| 2006/0028734 A1 | 2/2006 | Kuiper et al. | |
| 2006/0133789 A1 | 6/2006 | Yu | |
| 2006/0139585 A1 | 6/2006 | Maria Van Der Viist | |
| 2007/0211349 A1 | 9/2007 | Chen | |
| 2007/0263293 A1 | 11/2007 | Batchko et al. | |
| 2007/0299487 A1 | 12/2007 | Sahduck | |
| 2008/0277480 A1 | 11/2008 | Thurles | |
| 2010/0091389 A1 | 4/2010 | Henriksen et al. | |
| 2010/0133230 A1* | 6/2010 | Henriksen et al. | 216/26 |
| 2011/0149408 A1 | 6/2011 | Hahghault et al. | |
| 2011/0149409 A1 | 6/2011 | Haughault et al. | |
| 2011/0164330 A1 | 7/2011 | Henriksen et al. | |

FOREIGN PATENT DOCUMENTS

| | | |
|---|---|---|
| GB | 2163864 | 3/1986 |
| JP | 62151824 | 7/1987 |
| JP | 01140118 | 1/1989 |
| JP | 02178602 | 11/1990 |
| JP | 1062609 | 3/1998 |
| JP | 11-133210 A | 5/1999 |
| JP | 200081503 | 3/2000 |
| JP | 2000-249813 | 9/2000 |
| JP | 2001257932 | 9/2001 |
| JP | 2002-243918 | 8/2002 |
| JP | 2002239769 | 8/2008 |
| NO | 20064271 | 9/2006 |
| WO | WO 2004/038480 | 5/2004 |
| WO | WO 2004059364 | 7/2004 |
| WO | WO 2005085930 A1 | 9/2005 |
| WO | WO 2007/017089 A1 | 2/2007 |
| WO | WO 2008035983 | 3/2008 |
| WO | WO 2008035984 | 3/2008 |
| WO | WO 2008044937 | 4/2008 |
| WO | WO 2008044938 | 4/2008 |
| WO | WO 2010 005315 | 1/2010 |

OTHER PUBLICATIONS

International Search Report for corresponding Application No. PCT/NO2008/000056 dated May 16, 2009.

Written Opinion for corresponding Application No. PCT/NO2008/000056 dated May 16, 2009.

Chinese Office Action, dated Mar. 18, 2010 from CN Appl. 200780034604.6 filed Sep. 21, 2007.

* cited by examiner

FLEXIBLE LENS ASSEMBLY WITH VARIABLE FOCAL LENGTH

FIELD OF THE INVENTION

The present invention is related to an optical lens assembly with tunable focal length capabilities, and especially to an assembly of an adjustable lens assembly comprising a lens body of a compressible gel or elastomer material or similar material located in a cavity bounded by a support wall surrounding the cavity, and transparent covers located adjacent to each side on the lens body, respectively, attached to the sidewalls on each respective side, wherein piezoelectric actuators disposed on at least one of the transparent covers is providing a change in shape of the lens body by bending one or both covers, respectively when activated, thereby changing focal length of the lens assembly, according to the attached independent claim 1, and variants of embodiments according to the dependent claims.

BACKGROUND OF THE INVENTION

There is an ever increasing demand for low cost, high volume solutions for lens assemblies with adjustable focal length. Modern mobile phones, for example, are now equipped with miniature digital camera modules and the quality and cost demands for lenses and lens assemblies are increasing. More and more miniature cameras used in for example mobile phones and laptop computers comes with auto focus functionality. The design of lens systems for such applications requires fulfilment of a number of requirements, such as ease of operation when fitting the lens on top of a camera module, by providing as few operational steps as possible, etc. These challenges are even greater when the lens arrangement comprises tuneable parameters, such as encountered in auto focus lenses, wherein the focal length must be adjusted to fit the distance from the lens to the object to be photographed, for example. Such lenses are usually complex designs comprising movable parts which can make it difficult to assemble the lens in a simple manner. A further challenge with such designs is the ever increasing requirement to provide as thin lens assemblies as possible. Thin and lightweight mobile phones and cameras are a must in the marketplace.

There exist a number of feasible solutions for making compact auto focus lens elements. For example, liquid filled lens elements based on the principle of electro wetting is disclosed in WO2006136613. Another example is disclosed in the article "Design, fabrication and testing of a micro machines integrated tuneable micro lens", by Weisong et. Al., Journal of Micromechanics and Microengineering, 9 May, 2006, wherein a lens assembly containing a liquid in a cavity may be compressed or elongated to achieve an adjustment of focal length of the lens.

Both these two examples of prior art lenses comprise one or more liquids. Filling and confining a liquid to a cavity may impose problems during both production and use, as known to a person skilled in the art.

Another principle for a tuneable lens assembly is described in U.S. Pat. No. 4,802,746, wherein a plurality of elastic members is superposed in the optical axial direction. By applying a force on a side of the lens element, a deformation creates a curvature that results in variable focal properties, depending on the magnitude of the applied force.

JP 02178602 disclose a lens with an adjustable focal length comprising a transparent fluid 4 bounded by two transparent surfaces 1d, 2 and an elastic sealing material 3. The curvature of one of the transparent surfaces (1d) is adjusted by applying voltages onto a transparent piezo electric film 1c disposed onto the transparent surface.

JP 01140118 disclose a lens with an adjustable focal length comprising two transparent surfaces 1,3 with a fluid 2 in between bounded by a wall 10. The fluid 2 can be a gel or polymer. One of the transparent surfaces is a transparent piezo electric polymer, wherein the curvature of this surface is controlled by applied voltages onto the two electrodes 4, 5.

US 2002/0048096 disclose how to control deformations of a mirror 1. Piezo electric actuators 3 are arranged in a pattern on the backside of the mirror, and the deformation is controlled based on signals received from sensors attached to the mirror.

The Norwegian patent application No. 20065237 disclose a lens assembly comprising a floating glass cover on top of a gel or elastomer disposed on a transparent support. Piezoelectric actuators on top of the floating glass cover located in the periphery of the floating glass cover provides bending of the floating glass cover when activated that results in a change of the surface curvature of the gel or elastomer. However, the range of focal length adjustments is limited due to the limited range of bending of the floating glass cover. If the actuating force is to high, the edge of the floating glass cover may cut the gel or elastomer located directly under the edge of the floating glass cover thereby damaging the lens body, and hence the range of focal length adjustments are limited by this possibility of damaging the lens body.

Therefore there is a need to provide a lens assembly that provides the principal benefits of a lens assembly as disclosed in the Norwegian patent application No. 20065337, and that at the same time provides an increased range of focal length adjustments without changing properties of the lens assembly when adjustments are performed, and that protect the lens body against any form of damage when adjustment is performed in the whole range of adjustments, and that protect the lens body from damage or interference during manufacturing, when making interconnections, etc. of other optical and electronic components used together with the lens assembly according to the present invention. This property of the lens assembly according to the present invention also protects the lens assembly when using the lens assembly in an application.

SUMMARY OF THE INVENTION

According to an aspect of the present invention, a lens assembly constituted by a cavity filled with a transparent gel or elastomer forming a lens body, wherein the cavity is bounded by a side wall stretching entirely around the cavity, wherein a first transparent cover is attached on top of the sidewall whereas a second transparent cover is attached to the bottom side of the sidewall, respectively, fulfil the requirements according to the present invention. Piezo electric attenuators can be located on one or both transparent covers on each side of the lens body. When activated, the piezo electric actuators bends the glass covers they are attached to. However, since the glass covers are attached to the side wall, the bending of a glass cover will not move the edge of the glass cover since it is attached to the side wall. The bending will be achieved in an area on the glass cover adjacent to the edge of the glass cover providing an S shaped curvature in this area, which then changes the curvature of the lens body, and thereby the focal length of the lens assembly.

According to another aspect of the present invention, both glass covers may bend even when piezo electric actuators are only disposed on one of the transparent covers. The bending force on the gel or elastomer is transferred to the other transparent cover through the gel or elastomer if the thickness of the lens body is limited. When piezo electric actuators are provides on both transparent covers, respectively, the bending of the transparent covers can cooperate to amplify the total shaping of the lens body on both side of the optical axis of the lens body, thereby increasing the range of focal length changes that are possible. In an example of embodiment of the present invention control electronics controls the cooperative operation of the bending on both sides of the lens body, thereby providing a possibility to counteract the effect of the bending on one transparent cover onto the other transparent cover. Such controlling provides fine tuning and controllable adjustments of the focal length of the lens assembly over the total range of focal length adjustments. In addition, since the transparent cover protects the entire surface on each side of the lens body, there is no possibility of damaging the flexible lens body either by the edges on the transparent cover itself or by external impact on the surface of the lens body.

According to an example of embodiment of the present invention, a flexible lens body is bounded by sidewalls stretching entirely around the lens body wherein a substantial thin first transparent cover is provided with piezo electric elements on a top side of the sidewalls, while a second substantial thicker transparent cover is arranged as a support on a bottom side of the sidewalls, wherein a substantial concave surface is provided on the second surface of the second transparent cover facing towards the lens body. The concave shaping of the second transparent cover provides an impact on the first transparent cover when the first transparent cover is bending due to activations of the piezo electric elements. The effect of the impact from the second transparent cover onto the first transparent cover during bending is to provide a substantial spherical surface on the first transparent cover, thereby improving the optical properties of the lens is assembly.

According to an example of embodiment of the present invention, thin-film piezo actuators are disposed on at least one of the two transparent covers.

According to another aspect of the present invention, arranging a plurality of piezo electric actuators on one or both transparent covers on each side of the lens body respectively provides a possibility to control aberration errors, and also a possibility to provide new lens designs with novel features.

Another aspect of the present invention is to provide an adjustable lens design that can be mass produced using readily available wafer processes.

Yet another aspect of the present invention is to provide extremely compact adjustable lenses.

Another aspect of the present invention is to provide a lens element with improved optical focusing quality.

According to an example of embodiment of the present invention, one of the two transparent covers comprises a prism that through activation of piezo actuators on the transparent covers comprising the prism can change the direction of the light path in and out of the lens assembly, respectively.

According to yet another example of embodiment of the present invention, thermal expansion relief openings are provided in sidewalls of the lens assembly.

DETAILED DESCRIPTION OF AN EMBODIMENT

Figure 1A:
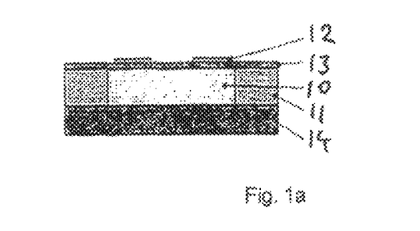
FIG. 1a depicts an example of embodiment of the present invention.

FIG. 1a illustrates an example of embodiment of the present invention comprising a lens body 10 made of a flexible material such as gel or elastomer materials bounded by sidewalls 11 and a first transparent cover 13 and a second transparent cover 14. The example depicted in FIG. 1a comprises piezo electric elements 12 located on the first cover 13. The sidewall 11 is a continuous sidewall surrounding the whole lens body 10. When the piezo electric elements 12 are activated, an S shaped curvature is formed on the top of the first transparent cover in a region adjacent to the sidewall 11. An example of such an S shaped curvature is depicted in FIG. 2d.

According to an example of embodiment of the present invention, the piezo electric elements 12 are thin-film piezo actuators that are transparent.

According to another example of embodiment of the present invention, both transparent covers 13 and 14 may comprise piezo electric elements 12. When activated both transparent covers 13 and 14 provides a shaping of the lens body 10 according to the principle described above, thereby extending the range of focal length adjustments.

According to an aspect of the present invention, the transparent covers 13, 14 may be thin glass covers. However, if only one of the transparent covers is arranged with piezo electric elements, for example the first cover 13 as illustrated in FIG. 1a, the curvature of a transparent cover activated by the piezo electric elements is usually not substantial spherical in shape due to some stiffness of the transparent cover material, such as usually encountered with thin glass covers. This deviation from a substantial spherical shape of the cover when bending it may in some embodiments of the present invention be beneficial for achieving certain optical effects in the lens body 10. However, this feature should be controllable. According to an aspect of the present invention, when piezo electric elements are arranged on both transparent covers 13, 14, this provides a possibility to control or counteract imperfect shaping of the transparent covers when the piezo electric elements are activated cooperatively. Different voltages applied on the different piezo electric elements may form the lens body into substantially any desired shape.

Figure 1B:
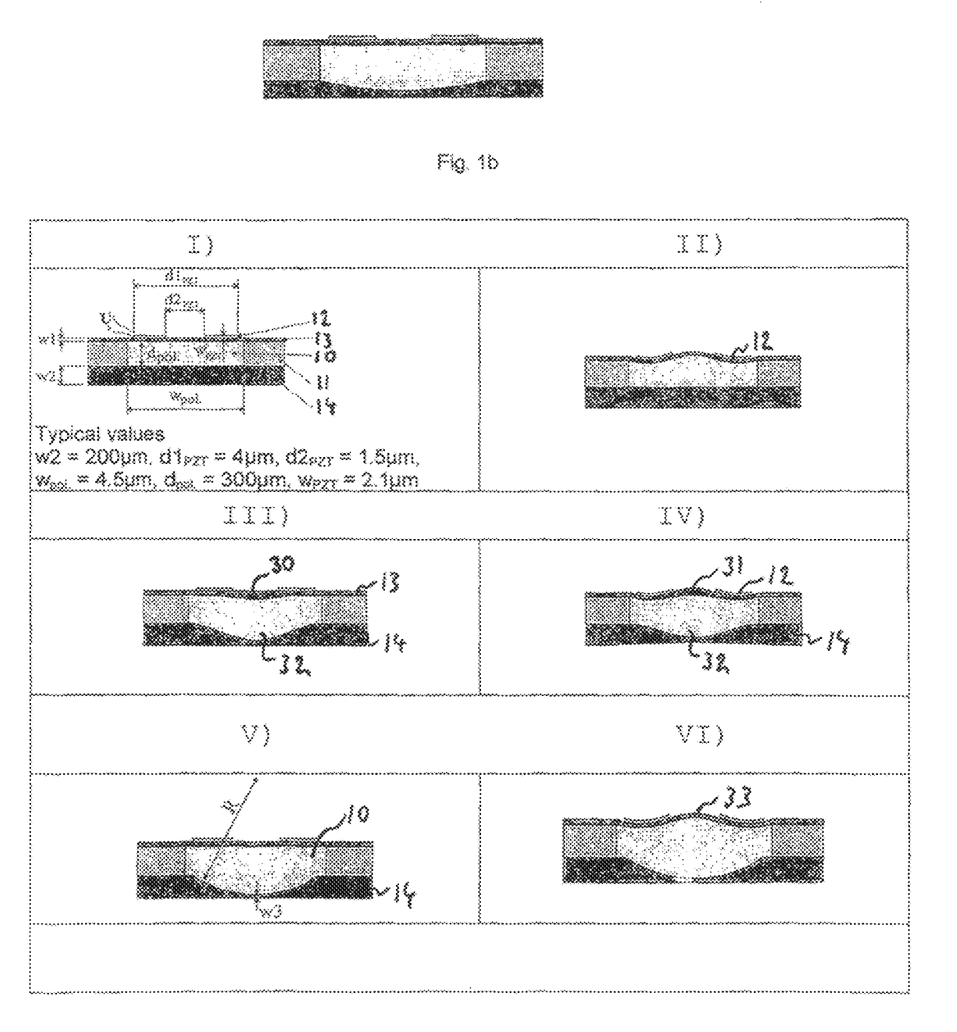
FIG. 1b depicts the effect of providing a substantial concave shaping of the second transparent cover on the side facing towards the lens body compared with an arrangement comprising a flat second transparent cover.

However, in some applications of the lens assembly, according to the present invention, the second transparent cover 14 may also acts as a support for the lens assembly, wherein movements of the second transparent cover 14 must sometimes be limited ore be eliminated due to interference with other objects in the assembly or application of the lens assembly. For example, a CCD chip may be located adjacent and even attached to the second transparent cover 14. Therefore, it would be impossible to counteract imperfect shaping of the first transparent cover 13 by bending the second transparent cover 14, due to lack of space for the counteracting movements or adjustments provided by the second transparent cover 14. According to an aspect of the present invention, such deviation from a substantial spherical shaping of the transparent cover 13 may be substantially reduced by introducing a concave surface on the side of the second transparent cover 14 facing towards the lens body 10, as depicted in FIG. 1b. The interfaces between the lens body 10 and sidewalls 11, and also between the transparent covers 13 and 14 is such that when the lens body 10 is squeezed due to the bending of a transparent cover, the interfaces as such provides a small adhesive effect holding back displacement movements of the flexible lens body in the regions of the lens body close to the interfaces. These adhesive effects contribute also to the imperfect shaping of the transparent cover 13. The concave shaping of the second transparent cover 14, as illustrated in FIG. 1b, exploits these properties of the interfaces to eliminate the deviation from the substantial spherical shape of the first transparent cover 13. The concave shaping provides a different displacement property of the lens body 10 when the lens body is shaped by the activation of piezo electric elements.

Figure 1C:
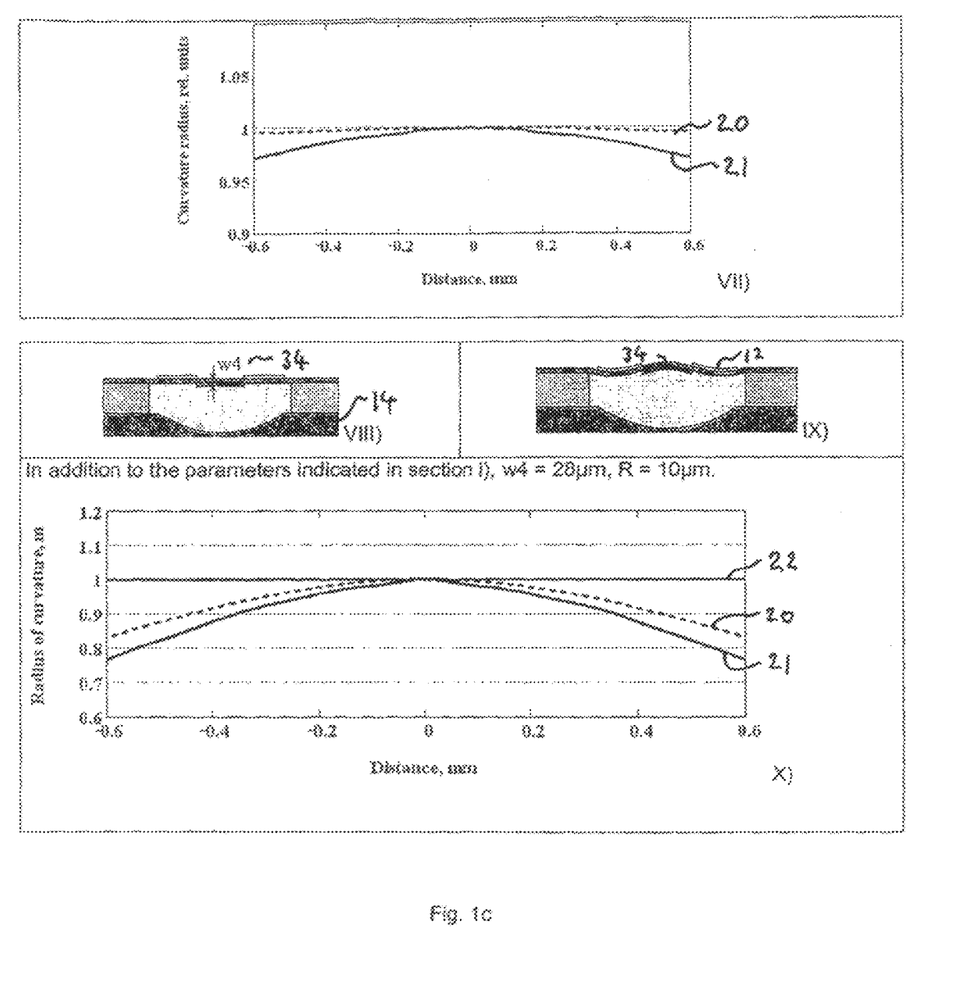
FIG. 1c illustrates different aspects of embodiments according to the present invention.

FIG. 1c illustrates different aspects of this situation and possible solutions to the problems related to the interfaces. In FIG. 1c section i) there is depicted an example of to embodiment comprising a flat second transparent cover 14 that is substantially thicker than the first transparent cover 13 which comprises the piezo electric elements 12. Some typical values for different dimensions of the lens assembly are also provided just as an example, and not as limiting values. In section i) there is no voltage applied onto the piezoelectric elements. In section ii) voltages are applied and the first transparent cover 13 is bending. To compensate the imperfect spherical curvature on the first transparent cover as illustrated in section ii), an example of embodiment as depicted in section is possible. The first transparent cover 13 may have a thicker middle section 30 in the optical axis of the lens assembly while the second transparent cover may have a thinner middle section 32 in the optical axis. The thinner section of the second transparent cover 14 may also permit bending of the second transparent cover when voltages are applied on the piezo electric elements on the first transparent cover. This is illustrated in section IV), wherein the bending of the second transparent cover 14 is indicated by the numeral 32. The thicker middle section of the first transparent cover 13 may also be formed as illustrated in section IV) indicated by numeral 31.

As depicted in the example of embodiment in section v) the thickness w3 may be such that a bending of the second transparent cover 14 is substantial zero (illustrated in section vi), which may be an advantage in some applications of the lens assembly, (stacking of additional lenses, other optical components etc.) However, the concave shaping of the surface of the second transparent cover 14 facing towards the lens body 10 is substantial sufficient to compensate the imperfect bending of the first transparent cover. In section vii) in FIG. 1c, there is a plot showing how the curvature of the first transparent cover 13 deviates from a substantial spherical curvature when the lens assembly is provided as depicted in section i) compared with the embodiment in section v), when voltages are applied on the piezo electric elements, respectively. The deviation from a spherical shape is measured as a relative measure, wherein a relative radius of 1 is a radius of a perfect spherical shape, and this measure is used as the Y axis in the plot in section VII). Symmetrically located points to the left and right (negative and positive numbers, respectively) of the optical axis through the lens assembly provides points on the X-axis where the relative radius has been measured. The plot designated 21 corresponds to the embodiment depicted in section i), and the plot 20 corresponds to the embodiment in section v). In this manner it is possible to manufacture lens assemblies according to the present invention with variable focal length capabilities that are compact in size, and that provides substantial spherical shaping of the first transparent cover 13 within the whole range of adjustments.

Section VIII) illustrates an embodiment of the present invention comprising a thicker middle section 34, and a concave surface on the second transparent cover 14. Section IX) illustrates the embodiment in VIII) when voltages are applied on the piezo electric elements 12. Section X) plots the different deviations from a spherical shape as measured for the embodiments in section I), V) a VIII), respectively. Numeral 21 is related to section I), numeral 20 to section V) and numeral 22 to the embodiment in section X).

Figure 2A:
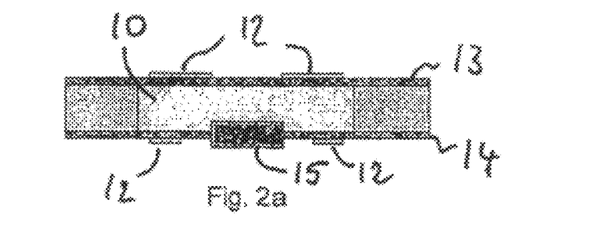
FIGS. 2a-2d illustrate other examples of embodiments of the present invention.
Figure 2B:
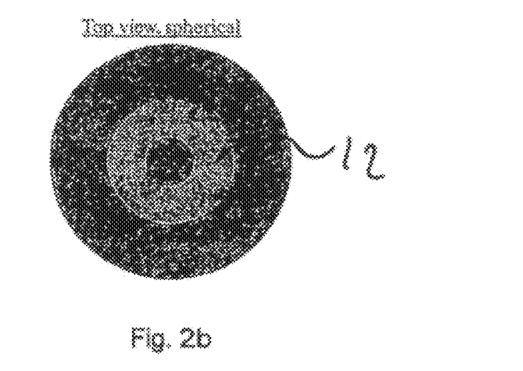
Figure 2C:
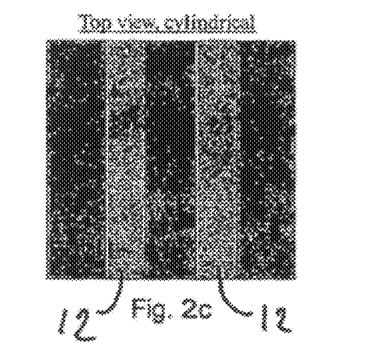
Figure 2D:
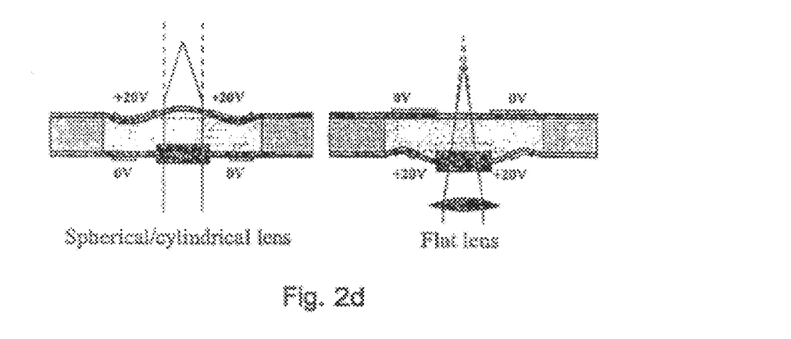

FIG. 2a illustrates another example of embodiment of the present invention. The example of embodiment comprises piezo electric elements 12 on both the first transparent cover 13 and the second transparent cover 14. In addition, there is arranged a prism 15 on the second transparent cover 14 located in between the piezo electric elements 12 in the middle of the optical axis of the lens body 10. In this manner, the piezo electric elements 12 may shift the light path through the lens assembly when voltages of opposite polarity are applied on the piezo electric elements 12, as illustrated for example in FIG. 4b. FIG. 2d illustrates the effect of first applying voltages of same positive polarity on the piezo electric elements on the first transparent cover 13 and the second cover 14, respectively. The voltages illustrated are just for illustrative purpose. Any combination of voltages may be used that are inside the range of voltages that can be used on the piezo electric elements. FIG. 2b illustrates a spherical top view, while FIG. 2c illustrates an embodiment of a cylindrical lens assembly.

Figure 4A:
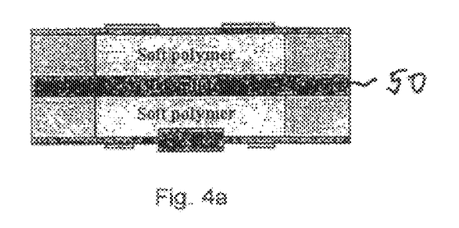
FIGS. 4a to 4c illustrates other examples of embodiments of the present invention.
Figure 4B:
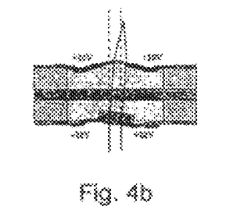

In some applications of the present invention, it may be an advantage that there is no interaction between the first transparent cover and the second transparent cover at all. FIG. 4a illustrates an example of embodiment of the present invention comprising a glass plate 50 inserted in the middle of the lens body 10. On both sides of the middle glass plate the lens body 10 is made of soft polymer. FIG. 4b illustrates how the top section of the lens assembly in FIG. 4a can be used to adjust the focal length while the bottom section can be used to control the light path direction through the prism.

Figure 3:
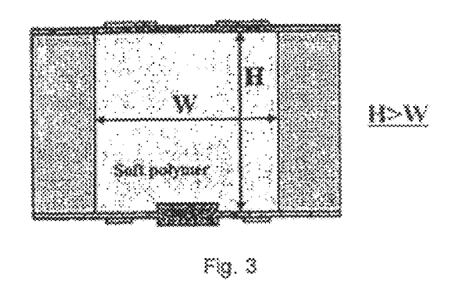
FIG. 3 illustrates the relation between width and height of the lens body in an example of embodiment of the present invention.
Figure 4C:
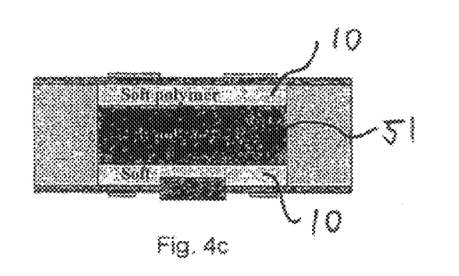

FIG. 3 illustrates that if the height H of the lens body 10 is greater than the width W, then the lens assembly would have substantially the same properties as the embodiment illustrated in FIG. 4a. FIG. 4c illustrates another example providing the same property as the examples of embodiments in FIGS. 3 and 4a. In the embodiment depicted in FIG. 4c, the middle section of the lens body 10 comprises a section 51 made of a stiffer polymer than the rest of the lens body 10.

Figure 6:
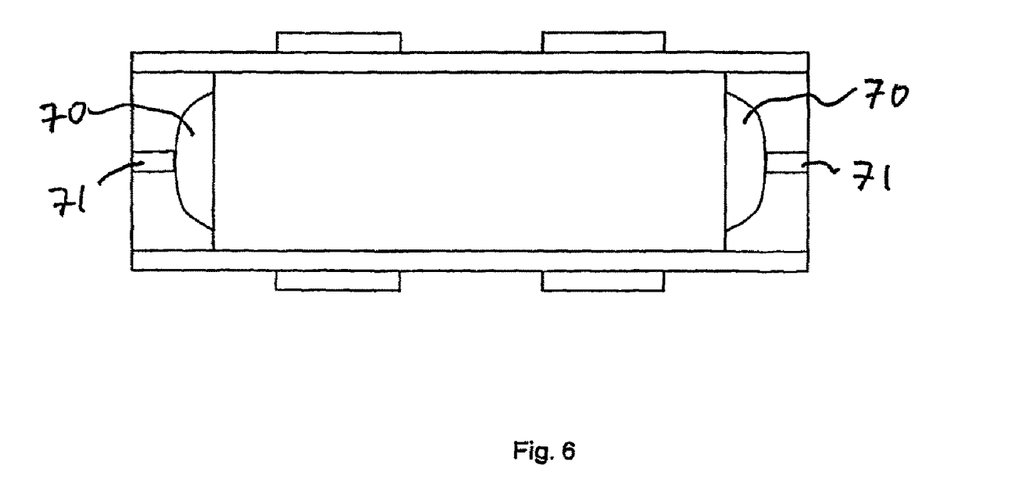
FIG. 6 illustrates an example of embodiment of the present invention comprising thermal expansion relief openings in sidewalls of the lens assembly.

Depending on the materials used in the lens assembly, the lens body can have a different thermal expansion coefficient than the sidewalls and/or transparent covers. Such a mismatch in thermal coefficients may introduce stress in the lens assembly affecting optical parameters of the lens. In an example of embodiment depicted in FIG. 6, thermal relief openings 70 are arranged in the sidewalls permitting the lens body to expand in size when heated, for example. Channels 71 are provided to relieve any form of pressure build up in the thermal relief openings 70.

Figure 5:
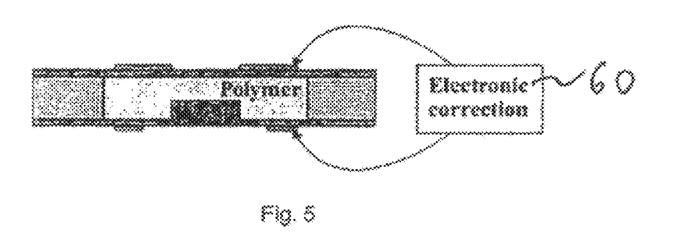
FIG. 5 illustrates an example of embodiment of the present invention comprising active electronic control circuitry.

The different voltages applied onto the piezo electric elements provide a bending of the attached transparent cover in the region wherein the piezo electric elements are located. The signal level (voltage level), duration of signal, signal shape etc. can be used to achieve different bending patterns of the lens body according to the present invention. Such cooperative application of signals can be done on piezo electric elements located on one of the two transparent covers independent of the other transparent cover, or as a cooperative application on both side of the lens assembly. Such variation of signal patterns and use can be managed by a controller attached to the piezo electric elements. FIG. 5 illustrates an example of embodiment comprising an electronic correction/controlling unit 60 in electric communication with the piezo electric elements on both sides of the lens assembly. The different signal patterns that is to be applied can be identified on basis of measurements (not shown) of optical parameters in the assembly or at other locations in the optical system the lens assembly is part of, as a feedback signal in the optical system, or as a selected pattern of signals stored in a memory in the electronic correction/controlling electronics, etc. The actual generation of applied voltages on the piezo electric elements are related directly to the application of the lens assembly according to the present invention. As part of an auto focus system in a camera, a range finder would signal the electronic correction/controlling electronic how the voltages should bring the focal length in the lens assembly to a correct state, as known to a person skilled in the art.

When manufacturing lens assemblies, according to the present invention, a plurality of materials can be used for the lens body, the side walls, the transparent covers etc. Table I below comprises some suitable examples of materials that can be used for manufacturing a lens body according to the present invention. Corresponding thermal expansion coefficients and refraction indexes are also provided. Depending on the application of the lens assembly, the expected temperature range for the application etc., a suitable combination of materials and embodiments according to the present invention may be selected from the table and be manufactured according to the principles of the present invention. Table I illustrates only examples of materials. According to an aspect of the present invention, any transparent material that can be deposited into a cavity forming a flexible lens body may be used.

TABLE I

| Materials | Linear CTE (ppm/K) | Refraction index |
| --- | --- | --- |
| Silicones | 200-350 | 1.40-1.58 |
| Polyurethanes | 100-250 | 1.6 |
| Polybutadiene rubbers | 500-600 | 1.50 |
| Fluorosilicones | 800 | 1.38-1.40 |
| Ethylene-propylene rubbers | 500-600 | 1.5 |
| Acrylonitrile butadiene rubbers | 700 | 1.52 |

The invention claimed is:
1. A lens assembly comprising:
a flexible lens body surrounded by a sidewall,
wherein a first transparent cover is attached on a top side of the lens assembly to the sidewall,
wherein the first transparent cover is arranged with a thicker middle section, and
wherein a second transparent cover is attached on a bottom side of the lens assembly to the sidewall, wherein the second transparent cover is arranged with a thinner middle section,
such that the transparent covers are in contact with respective surfaces of the lens body, and when piezo electric elements disposed on at least one of the two transparent covers are activated, the bending of the at least one transparent cover is shaping the lens body such that the focal length of the lens assembly is adjusted.

2. A lens assembly according to claim 1, wherein the second transparent cover is arranged substantially thicker than the first transparent cover, wherein a concave shaping of the second transparent cover is provided as the thinner middle section, wherein the concave shaping is facing towards the lens body.

3. A lens assembly according to claim 1, wherein a plurality of piezo electric elements are arranged in a pattern on at least one of the transparent covers, providing a specific bending of the transparent cover when the piezo electric elements are activated.

4. A lens assembly according to claim 3, wherein the plurality of piezo electric elements are disposed in a ring shaped pattern.

5. A lens assembly according to claim 3, wherein the plurality of piezo electric elements are disposed in a straight shaped pattern.

6. A lens assembly according to claim 1, wherein a prism is arranged in a middle section of at least one of the first or second transparent cover in between the piezo electric elements.

7. A lens assembly according to claim 1, wherein a height of the lens body is greater than a width of the lens body.

8. A lens assembly according to claim 1, wherein a glass plate is arranged in a middle section of the lens body dividing the lens body into two separate and independently functional lens body sections.

9. A lens assembly according to claim 8, wherein the glass plate is replaced by a section comprising a stiffer lens body material than the rest of the lens body.

10. A lens assembly according to claim 1, wherein activation of the piezo electric elements are provided by voltages supplied from an electronic controller.

11. A lens assembly according to claim 10, wherein the activation of the piezo electric elements on both sides of the lens assembly is controlled by the electronic controller in a cooperative manner, 12. A lens assembly according to claim 10, wherein the activation of the piezo electric elements on both sides of the lens assembly is controlled by the electronic controller in an independent manner.

13. A lens assembly according to claim 1, wherein thermal relief openings are arranged in the sidewall.

14. A lens assembly according to claim 13, wherein channels are arranged through the sidewall to relieve any pressure build up in the thermal relief openings.

* * * * *